United States Patent Office 2,896,427
Patented July 28, 1959

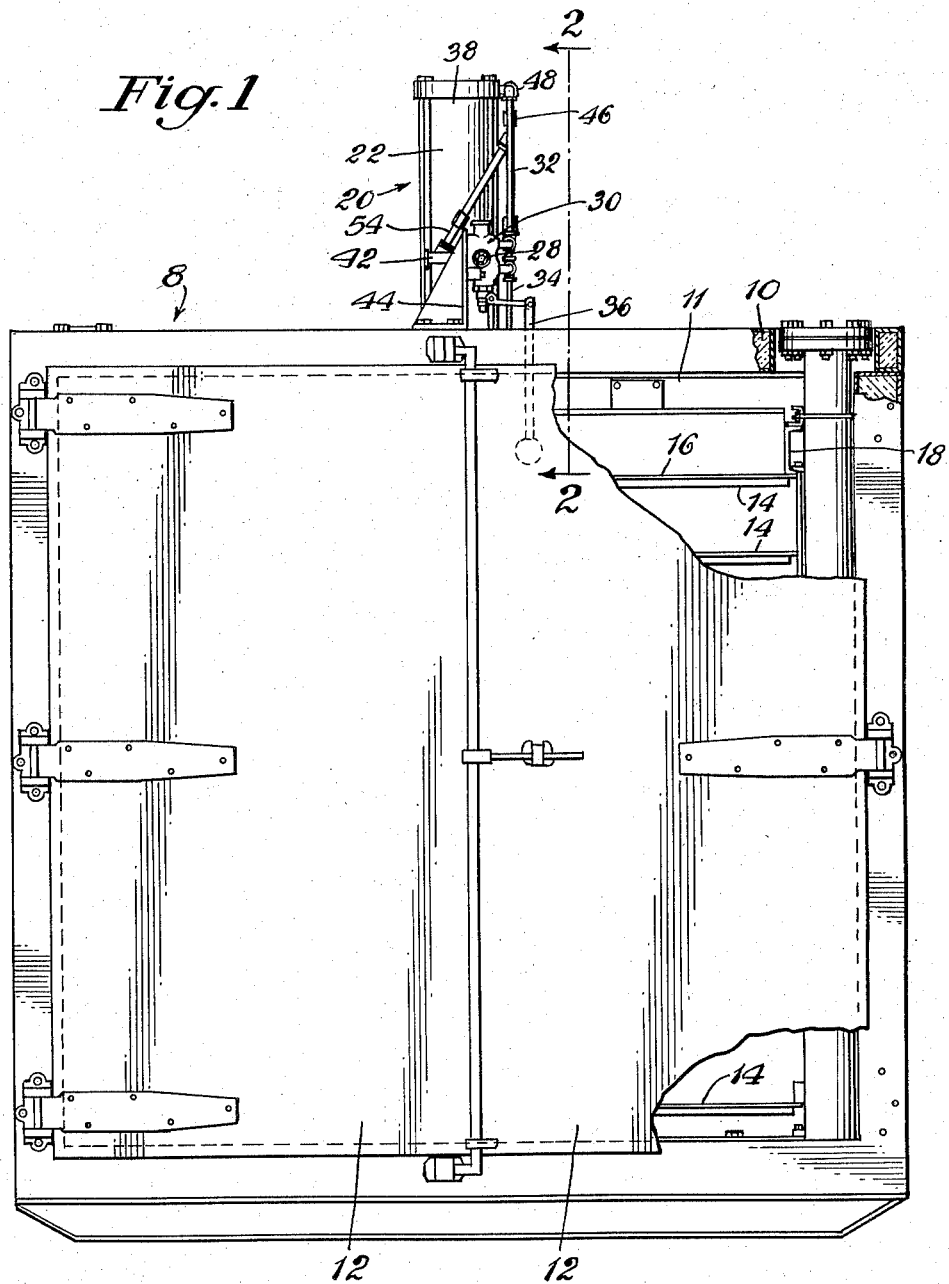

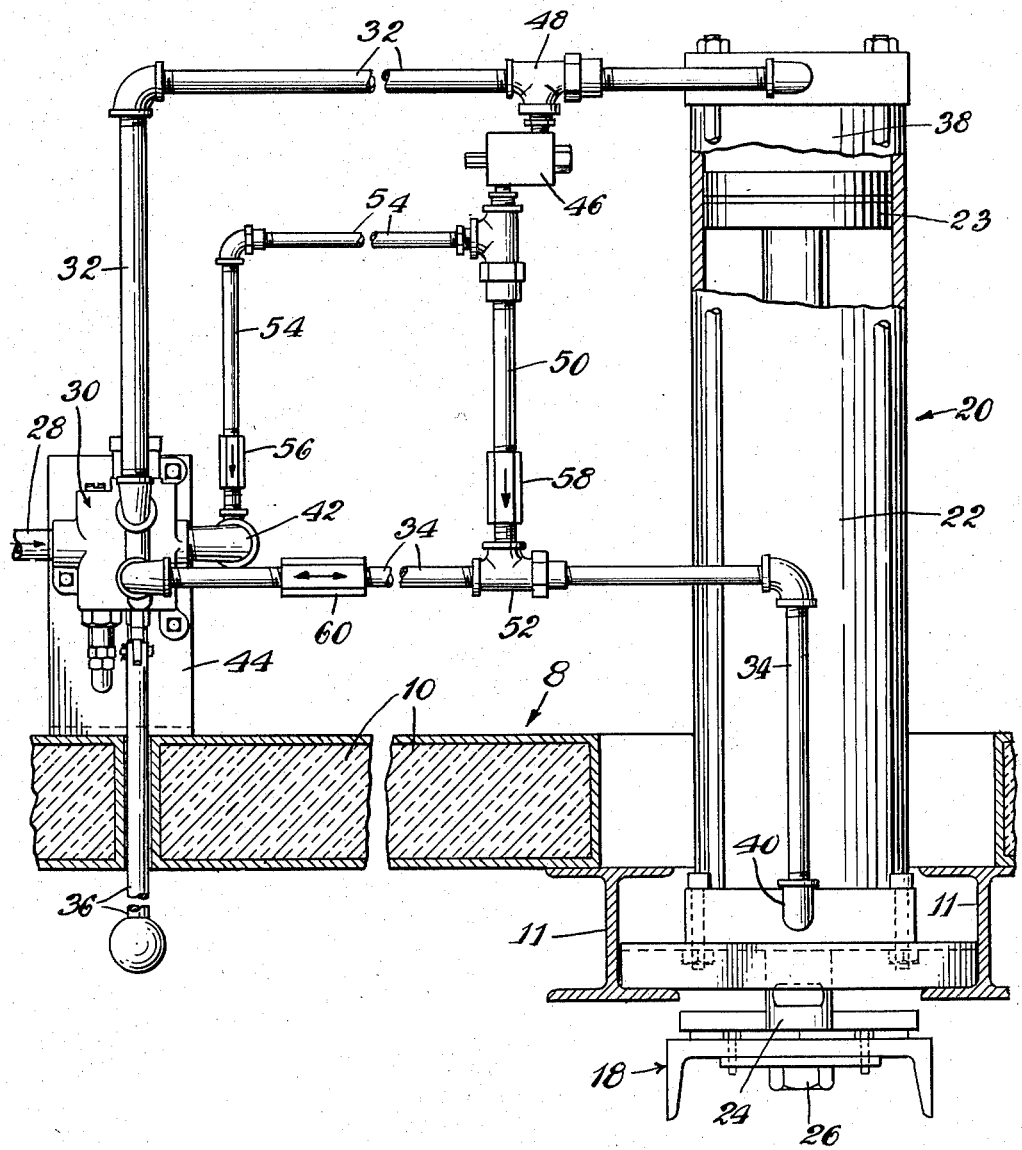

2,896,427

HYDRAULIC SYSTEM FOR FREEZER

William E. Lauterbach and Peter Strutynski, Chicago, Ill., assignors to Dole Refrigerating Company, Chicago, Ill., a corporation of Illinois Application December 13, 1956, Serial No. 628,085

7 Claims. (Cl. 62—341)

Our invention is in the field of freezers, preferably of the double contact plate freezer type, although it is not necessarily limited thereto. The invention is concerned with a power mechanism constructed to prevent excessive pressures during freezing or other types of expansion.

A primary object of our invention is a double contact freezer constructed so that when the food products freeze between the plates causing expansion, its hydraulic power mechanism will maintain a constant pressure without damage.

Another object is a hydraulic power mechanism for a double contact freezer constructed to prevent excessive pressures between the plates during freezing.

Another object is a hydraulic power mechanism for a double contact freezer constructed to prevent excessive pressures between the plates during freezing.

Another object is a hydraulic mechanism for double contact freezers constructed to prevent the development of excessive pressures at all times.

Another object is a double contact freezer having a hydraulic mechanism for actuating the plates which cannot be damaged by the operator.

Another object is an efficient hydraulic mechanism for raising and lowering the plates in a double contact freezer, that automatically compensates for expansion in the stack of plates when the food freezes.

Other objects will appear from time to time in the ensuing specification and drawings in which:

Figure 1 is a front view, with parts broken away; and

Figure 2 is an enlarged section along line 2—2 of Figure 1.

In Figure 1, a double contact freezer of any conventional type has been shown as including a housing 8 having insulation 10 around and supported by a suitable frame 11 forming a cabinet with suitable doors or the like 12 which may be opened to provide access to a plurality of generally horizontally arranged spaced freezer plates designated generally at 14. The exact number of plates used is unimportant. The plates are interconnected by any suitable mechanism, bolts, toggles, springs or what have you, so that they may be opened and closed in accordion fashion. The bottom plate may be stationary with the plates above it being raised and lowered. The spaces between the plates may be considered freezing stations and pans of packaged food may be inserted when the plates are fully opened. Thereafter, by a power mechanism, the plates are all brought together in accordion fashion with the packaged food in between to uniformly decrease the vertical distance between adjacent plates providing a full plate contact on both the upper and lower surfaces of the packaged food. Any suitable mechanism may be used for cycling a volatile refrigerant through the plates in any suitable manner. Doors may be provided for both the front and back of the housing or cabinet so that unfrozen food may be loaded on one side while frozen food is being removed from the other. The details of the cabinet are unimportant as is the mechanism that allows for opening and closing the plates and also the precise manner in which they open and close.

The top plate 16 may be connected to a suitable pressure frame 18. A hydraulic mechanism, designated generally at 20, may be mounted on the top or roof of the cabinet or on the main frame 11 and includes a power cylinder 22 and piston 23 with a piston rod 24 that extends through a suitably insulated opening in the top of the cabinet. The end of the piston rod may be connected in any suitable manner as at 26 to the pressure frame 18 to raise and lower the pressure frame, thereby opening and closing the plates.

A suitable source of comparatively high pressure hydraulic fluid 28 is in communication with the power cylinder through a control valve 30 with an integral check valve and suitable lines or pipes 32 and 34. The valve 30 may have a suitable handle 36 that extends through the roof of the cabinet so that it may be manually actuated only when the doors are open. The valve places the source of hydraulic fluid in communication with the top of the cylinder at 38 forcing the piston down to close the freezer plates, and at the same time it places the bottom of the cylinder 40 in communication with a suitable sump 42 or the like through the line 34. Hereinafter, we may refer to that portion of the mechanism that places the source of hydraulic fluid in communication with the top of the piston, including the line 32, as the closing side of the system, while the lower side of the piston and the line 34 may be referred to as the opening side, it being understood that manipulation of the control valve 30 places the source of hydraulic fluid in communication with either one side or the other while venting the non-selected side to the sump 42. The power cylinder may be mounted on the top of the housing in any suitable manner and the details are unimportant, while the control valve may be suitably mounted on a bracket 44 or the like, if desired, on top of the housing. A suitable pump may be provided to supply the hydraulic fluid from the source to the control valve at any selected pressure. The control valve 30 is preferably four-way, with three positions in that it may be placed in a closing, an opening, or a neutral position. In the neutral position, the hydraulic fluid in both the opening and closing sides of the system will be trapped and the valve will be entirely closed to communication. In the closing position the usual check valve, either integral or in line, will also trap the closing side.

When a freezer of this general type is freezing certain types of foods, which have a relatively high water content, considerable expansion will occur. As an example, freezers that have 21 plates, defining 20 freezing stations each with a two-inch thickness of food, such as fish, have been known to expand as much as four inches. This expansion is exerted against the piston rod since the other sides are contained. If the control valve is in either the closing position or accidentally left in the neutral position, this expansion will tend to move the piston upward in a vertical system and to one side in a horizontal system. The piston will in turn tend to compress the fluid in the closing side and create a vacuum in the opening side simultaneously. Each of these is highly undesirable. The high pressure on the closing side will subject the closing side ports to a strain that could burst the cylinder or rupture some of the connecting piping. The vacuum on the opening side might draw air into the system, which in turn could form a flammable mixture with the usual hydraulic fluids, as well as causing very irregular operation.

To solve this problem, we provide a suitable relief valve 46 which may be connected to or in communication with the closing side of the system by a T-connection 48 or the like. This valve may be set so that at a predetermined pressure, excess fluid will be exhausted from the closing side and supplied to the opening side by a suitable connection 50 connected to the line 34, for example, by a T 52. The volume of fluid displaced from the closing side will exceed the volume the opening side can accommodate because the piston rod occupies a substantial portion of the cylinder below the piston. Therefore, the excess may be returned to the sump by a suitable lead 54 with a check valve 56 to prevent reverse flow. We also provide a check valve 58 in the line 50 to prevent fluid from escaping from the opening side when the plates are being raised or opened. We may also provide a flow control or throttle valve 60 in the line 34 for the opening side of the system to provide uniform motion of the piston. Otherwise, the weight of the plates and food packages might pull the piston down faster than fluid could enter the cylinder. But rapid movement of the piston could cause a vacuum on the upper side of the piston.

The use, operation and function of our invention are as follows:

The hydraulic system shown and described is arranged to provide communication between a source of high pressure fluid and either side of a power cylinder and piston for opening and closing freezer plates, preferably of the double contact type. When the plates are opened and the stations have been fully loaded with food, the control valve is actuated, either manually or otherwise, so that high pressure fluid flows through the line 32 and forces the piston down, closing the plates. When the plates are fully closed, it is recommended that the control valve be in the closing position and the integral check valve prevents reverse flow through line 32. Operators on occasion put the valve in the neutral position, thereby trapping hydraulic fluid in both sides. Freezing of the food may take several hours, but when the food freezes, it expands. A maximum expansion will occur in foods that have the highest water content. The expansion forces the piston up developing high pressures in the closing side of the hydraulic system and pulling a vacuum in the opening side. The setting of the relief valve may be 15 to 20 percent higher than the setting of the integral check valve. When a predetermined pressure is developed in the closing side, the relief valve will vent or exhaust fluid from the closing side to the opening side through the bypass or pipe 50, thereby relieving both the excess pressure in the closing side and the vacuum in the opening side, and preventing air from being drawn in. The excess of fluid, created by the presence of the piston rod in the opening side of the system, is vented to the sump by a suitable connection.

The relief valve serves a double function. In addition to relieving both the excess pressures developed in the closing side and the vacuum caused in the opening side by the expansion of the freezing foods, it will also relieve the exhaust fluid to the sump when the plates are being closed if the pump develops an excess pressure in the line 32 leading to the top of the piston.

The system is foolproof and safe. Regardless of the position of the handle 36, whether the operator leaves it in the closing position or in neutral, the mechanism cannot be damaged by the expansion of the freezing foods. Leakage will not develope after long periods of use, and wear and replacement problems will be at a minimum.

The invention has been illustrated in connection with a double contact freezer, but it might be used with other types of freezers, and the appended claims should be interpreted accordingly.

While we have shown and described a preferred form and suggested several variations of our invention, it should be understood that numerous additional modifications, changes, substitutions and alterations may be made without departing from the invention's fundamental theme.

We, therefore, wish that the invention be unrestricted except as by the appended claims.

We claim:

1. In a double contact freezer or the like, a housing, a plurality of freezer plates movably mounted therein so as to close and open, as a group, in accordian fashion, and fluid power means for closing and opening the plates including a power cylinder, piston and piston rod for moving the plates, a source of high pressure fluid and a sump, closing and opening sides between the fluid source and the power cylinder including lines connecting the source of high pressure fluid to each side of the piston, a control valve to place the source of high pressure fluid in communication with either the closing or the opening side of the power cylinder while venting the other side to the sump, a relief valve in communication with the closing side set to exhaust fluid therefrom at and above a predetermined pressure, a connection for supplying at least a part of the exhausted fluid to the opening side, and a return line for conveying any excess fluid from the relief valve to the sump.

2. The structure of claim 1 further characterized in that the opening side includes the side of the power cylinder with the piston rod.

3. For use in a freezer for freezing food and the like, a freezer mechanism, a hydraulic power cylinder and piston for applying pressure to the mechanism, a hydraulic fluid source, and a hydraulic system therefor including a pressure applying side for applying pressure to the freezer mechanism when fluid is applied to it from the source, and a pressure relieving side for relieving pressure from the freezer mechanism when fluid is supplied to it from the source, means for selectively supplying fluid to one side or the other, a relief mechanism between the sides for exhausting fluid from the one side to the other in response to excessive pressures developed in the one side due to expansion of the food during freezing, and a return line for conveying any excess fluid from the relief mechanism to a sump.

4. The structure of claim 3 in which the freezer mechanism includes a plurality of movably mounted double contact freezer plates adapted to be opened and closed by the power cylinder and piston in accordion fashion.

5. In a double contact freezer or the like, a housing, a plurality of freezer plates movably mounted therein to be opened and closed, as a group, to apply pressure to food products placed between the plates, a hydraulic system for opening and closing the plates including a power cylinder, piston and piston rod, a source of high pressure fluid, closing and opening sides between the fluid source and the piston including lines connecting the fluid source to the cylinder on each side of the piston, a control valve in the lines to place the fluid source in communication with either the closing or opening side of the piston while venting the other side, a relief valve connected to the closing side to exhaust fluid therefrom at and above a predetermined pressure when that pressure has been developed in the closing side due to expansion of the food products when freezing between the plates, a connection to the relief valve for supplying at least a part of the exhausted fluid from the relief valve to the opening side so that the cylinder on the opening side will be filled as the piston moves due to expansion of the food products while freezing, and an auxiliary line in communication with the outlet side of the relief valve for conveying excess fluid away from the opening side due to the volume occupied by the piston rod in the opening side of the cylinder.

6. For use in a double contact freezer or the like in which a plurality of freezer plates are movably mounted to be opened and closed as a group so as to apply pressure to food products placed between them, a hydraulic system constructed to be connected to the plates so as to open and close them, including a power cylinder, piston and piston rod, a source of high pressure fluid, closing and opening sides between the fluid source and the piston, including lines connecting the fluid source to the cylinder on each side of the piston, a control valve in the lines to place the fluid source in communication with one side of the piston while feeding either side, a relief valve connected to the closing side to exhaust fluid therefrom above a predetermined pressure when that pressure has been developed in the closing side due to expansion of the food products freezing between the plates, a connection to the relief valve for supplying at least a part of the thus exhausted fluid from the closing side to the opening side so that the cylinder on the opening side will be filled as the piston moves due to expansion of the food products, and an auxiliary line in communication with the outlet side of the relief valve for conveying excess fluid away from the opening side, such excess being caused by the volume occupied by the piston rod in the opening side of the cylinder.

7. The structure of claim 6 further characterized by and including a check valve in the connection between the relief valve and the opening side to prevent a backflow of fluid into the closing side from the opening side when the plates are being either opened or closed.

References Cited in the file of this patent
UNITED STATES PATENTS

| | | |
|---|---|---|
| 736,302 | Sarver | Aug. 11, 1903 |
| 1,905,131 | Birdseye et al. | Apr. 25, 1933 |
| 2,462,580 | Watson | Feb. 22, 1949 |
| 2,632,312 | Polk | Mar. 24, 1953 |